United States Patent [19]
Chinnaswamy et al.

[11] Patent Number: 5,371,874
[45] Date of Patent: * Dec. 6, 1994

[54] WRITE-READ/WRITE-PASS MEMORY SUBSYSTEM CYCLE

[75] Inventors: Kumar Chinnaswamy, Milford; Michael A. Gagliardo, Shrewsbury; John J. Lynch, Wayland; James E. Tessari, Arlington, all of Mass.

[73] Assignee: Digital Equipment Corporation, Maynard, Mass.

[*] Notice: The portion of the term of this patent subsequent to Feb. 9, 2010 has been disclaimed.

[21] Appl. No.: 105,101

[22] Filed: Aug. 9, 1993

Related U.S. Application Data

[63] Continuation of Ser. No. 583,176, Sep. 14, 1990, abandoned, which is a continuation-in-part of Ser. No. 302,839, Jan. 27, 1989, Pat. No. 5,185,875.

[51] Int. Cl.$^5$ .............................................. G06F 15/16
[52] U.S. Cl. ...................... 395/425; 395/400; 364/228; 364/243.4; 364/243.41; 364/228.3; 364/DIG. 1
[58] Field of Search ............... 395/200, 425, 400, 325

[56] References Cited

U.S. PATENT DOCUMENTS

| | | | |
|---|---|---|---|
| 3,771,137 | 11/1973 | Barner et al. | 340/172.5 |
| 4,410,944 | 10/1983 | Kronies | 364/200 |
| 4,503,498 | 3/1985 | Antonor et al. | 364/200 |
| 4,663,742 | 5/1987 | Andersen et al. | 365/189 |
| 4,747,043 | 5/1988 | Rodman | 364/200 |
| 4,783,736 | 11/1988 | Ziegler et al. | 395/425 |
| 4,794,521 | 12/1987 | Ziegler et al. | 364/200 |
| 4,847,804 | 6/1989 | Shaffer et al. | 364/900 |
| 4,858,111 | 8/1989 | Steps | 364/200 |
| 4,875,161 | 10/1989 | Lahti | 395/425 |
| 4,905,188 | 2/1990 | Chuang et al. | 364/200 |
| 4,920,539 | 4/1990 | Albnesi | 364/200 |
| 4,939,641 | 7/1990 | Schwartz et al. | 364/200 |
| 4,977,498 | 12/1990 | Rastegar et al. | 395/425 |
| 4,995,041 | 2/1991 | Hetherington et al. | 395/425 |
| 5,023,776 | 6/1991 | Gregor | 395/425 |
| 5,043,886 | 8/1991 | Witek et al. | 395/425 |
| 5,055,999 | 10/1991 | Frank et al. | 364/200 |
| 5,097,409 | 3/1992 | Schwartz et al. | 395/425 |
| 5,133,058 | 7/1992 | Jensen | 395/400 |
| 5,133,059 | 7/1992 | Ziegler et al. | 395/425 |
| 5,163,142 | 11/1992 | Mageau | 395/425 |
| 5,185,875 | 2/1993 | Chinnaswamy et al. | 395/425 |
| 5,255,384 | 10/1993 | Sachs et al. | 395/400 |
| 5,276,848 | 1/1994 | Gallagher et al. | 395/425 |

OTHER PUBLICATIONS

J. Archibald, "Cache Coherence protocols: Evaluation using a multiprocessor simulation model", ACM Transactions on Computer Systems, vol. 4, No. 4, Nov. 1986.

*Primary Examiner*—Allen R. MacDonald
*Assistant Examiner*—Toriq Hafiz
*Attorney, Agent, or Firm*—Arnold, White & Durkee

[57] ABSTRACT

Methods and apparatus for reducing memory read latency for selected data requested by one central processing unit (CPU) and retrieved from another CPU through a system control unit (SCU) with special data transfer cycles. The special data transfer cycles include a first dual operation mode which confirms that the transferred data is the most current and then concurrently write the CPU transferred data into the SCU main memory while transferring it directly to the requesting CPU, and a second dual operation mode which confirms that only a portion of the transferred data is the most current and then concurrently write the portion of the transferred data that is most current in the SCU memory and read the written data for transfer to the requesting CPU.

4 Claims, 4 Drawing Sheets

WRITE-READ/WRITE-PASS MEMORY SUBSYSTEM CYCLE

RELATED APPLICATIONS

This application is a continuation of application Ser. No. 07/583,176 filed Sep. 14, 1990, now abandoned, which is a continuation-in-part of application Ser. No. 07/302,839, filed Jan. 27, 1989, now U.S. Pat. No. 5,185,875.

FIELD OF THE INVENTION

The present invention relates to digital computer memory control systems, and more particularly to methods and apparatus for initiating multiple operation commands for central processor unit (CPU) to central processor unit (CPU) data transfers in a digital computer system including a system control unit (SCU) and multiple CPU's.

BACKGROUND OF THE INVENTION

In a digital computer system which includes an SCU with an associated main memory and multiple independent CPU's, each CPU with its own associated writeback cache, data stored in the SCU main memory may be invalid because more current data has been entered into one of the CPU's and stored into its associated CPU cache. A CPU in the system which requests selected data must find out if the version of the requested data stored in the SCU main memory is the most current version, or if not, the location of the CPU cache in which the most current version is stored. To this end, the SCU may contain a data storage location directory which includes a cache consistency unit (CCU) which indicates if the requested data stored in the SCU main memory has been invalidated, and the CPU cache location for the refreshed version of the requested data.

To provide the requesting CPU with data which is stored in the cache of another CPU, it has been necessary to read the data of the CPU cache in which the most current version of the requested data is located, transfer the read data back to the SCU, and then write the received data into the SCU main memory so that the received data replaces the less current version of the requested data already stored in the SCU main memory. After the refreshed data received from the located CPU is written into the SCU main memory, the SCU main memory is read so that the refreshed data can be transferred to the requesting CPU.

However, the above described procedure involves significant memory read latency because the SCU must first initiate a write cycle with a "WRITE" command to enter the refreshed data transferred to it into memory, and then, when the write cycle is complete, initiate a read cycle for the same data address with a "READ" command to transfer the most current version of requested data written in the SCU main memory to the requesting CPU. Thus, two complete SCU main memory cycles are necessary every time requested data is transferred to a requesting CPU from a cache of another CPU through the SCU.

SUMMARY OF THE INVENTION

The present invention minimizes memory read latency when requested data is transferred from the cache of a located CPU through the SCU to a requesting CPU by using new cycles which combine two operations at once with a single command. These new cycles may be termed a "WRITE-READ" cycle and a "WRITE-PASS" cycle. The "WRITE-READ" cycle permits the SCU to perform a write cycle and a read cycle to the same address concurrently. The "WRITE-PASS" cycle allows the SCU to concurrently write data received from a CPU and pass the same data onto another CPU in one cycle. The "WRITE-READ" and "WRITE-PASS" cycles are initiated with single commands.

DETAILED DESCRIPTION OF THE PREFERRED EMBODIMENTS

Figure 1:
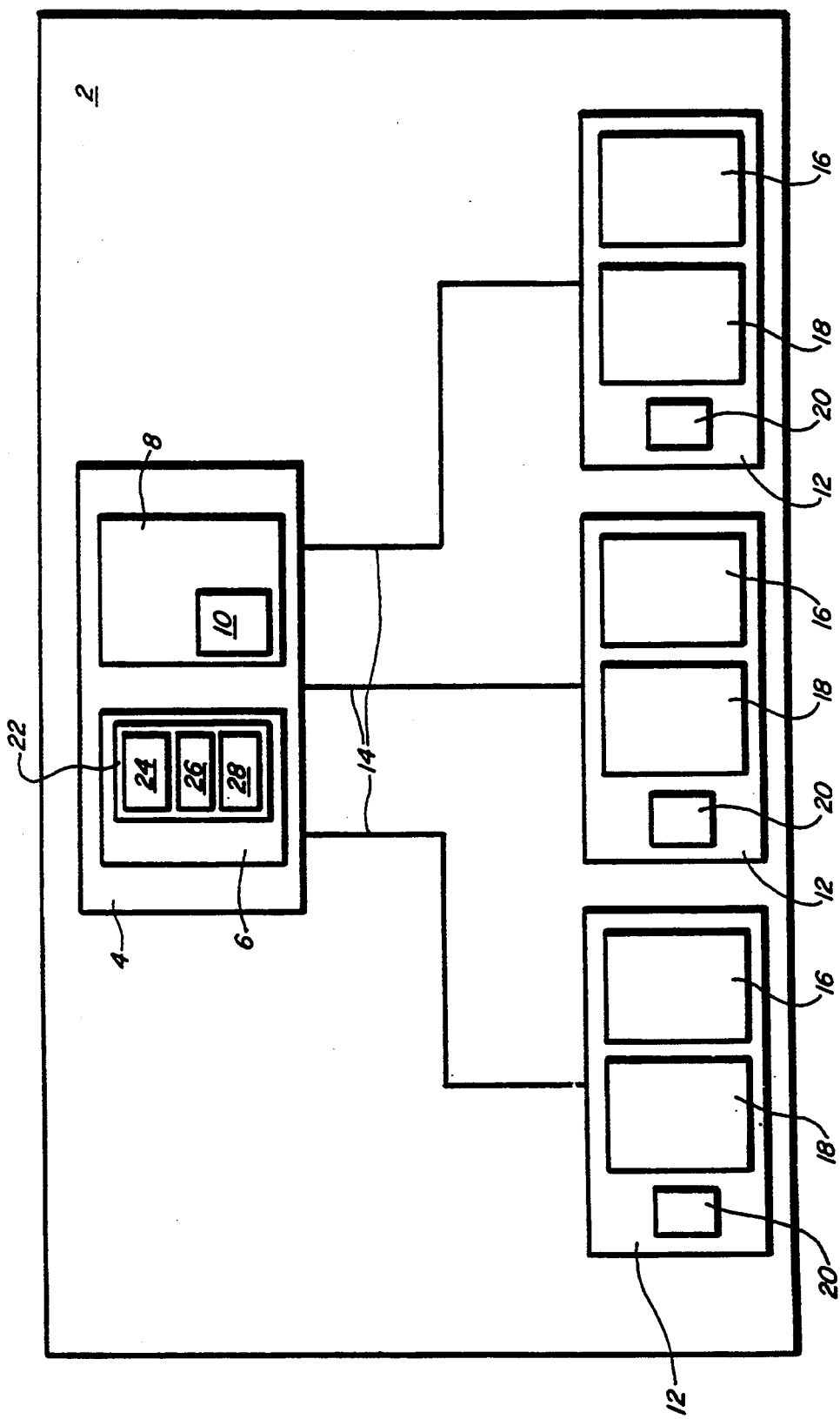
FIG. 1 is a block diagram of a typical digital computer system with a SCU and associated independent CPU's suitable for incorporating the present invention.

Referring to the drawings, wherein like reference characters designate like or corresponding parts throughout the views, FIG. 1 shows a typical digital computer system 2 suitable for incorporating the present invention. The system 2 includes a system control unit (SCU) 4 with an associated SCU main memory 6 and SCU data storage location directory 8. The directory 8 includes a cache consistency unit (CCU) 10 which indicates, for any requested data address from the SCU main memory 6, if the SCU main memory 6 data is superceded by a more current version of the requested data elsewhere in the system 2 with implementation well known in the art.

The SCU 4 is typically interconnected to a plurality of independent central processing units (CPU's) 12 via individual associated data bus links 14. Each one of the CPU's 12 has a writeback cache 16, a control unit 18 and an input/output (I/O) unit 20.

As well known in the art, the CPU's 12 may individually accept and store data in their associated caches 16. This data may not be in the SCU main memory 6 or may include a refreshed (more current) version of data that is stored in the SCU main memory 6. Also in accordance with the prior art, the addresses of data written into the individual CPU's 12 are transferred to the SCU 4 for storage in the SCU data storage location directory 8, and the CCU 10 indicates which SCU main memory 6 data has been superceded by more current versions in one of the CPU caches 16.

As part of the data transfer process from one of the CPU's 12 through the SCU 4 and to a requesting one of the CPU's 12, it is highly desirable to not only transfer the most current version of the data requested to the requesting one of the CPU's 12 from another one of the CPU's 12, but also to update the SCU main memory 6 at the same time, while also registering in the SCU directory 8 that the SCU main memory now has the most current version of the requested data. In this way, additional requests for the same data may be read from the SCU main memory 6, until one of the CPU's 12 refreshes the requested data still further.

However, the above described process of refreshing the SCU main memory 6 with the transferred data according to the prior art generally involves at least the execution of two distinct commands, a "WRITE" command to write the transferred data received by the SCU 4 at a selected address, followed by a "READ" command at the same address. The use of two such distinct commands then requires the execution of two complete data transfer timing cycles for the SCU main memory 6, thereby at least doubling memory read latency relative to a single cycle data transfer operation.

The present invention eliminates memory read latency caused by the need for two distinct commands and two complete data transfer timing cycles for the SCU main memory 6 by using combined operation cycles for the process of transferring the requested data between the CPU's 12 and concurrently storing the transferred data into the SCU main memory 6. In the preferred embodiment of the invention, complete blocks of data are transferred from the CPU's 12 to the SCU 4 and from the SCU 4 to the CPU's 12. The blocks of data preferably comprise eight quadword (64 bit) segments of data. Thus, data is transferred in blocks of eight quadword segments.

When the transferred block of data has been validated as the most current version by the SCU directory 8, it is treated as a confirmed block of data, and a "WRITE-PASS" cycle is used. This cycle allows the validated block of data to be passed through the SCU 4 to the requesting CPU 12 as the validated block of data is written into the SCU main memory 6. When the transferred block of data has not been validated by the SCU directory 8, it is treated as an unconfirmed block of data, and a "WRITE-READ" cycle is used. This cycle allows only validated portions of the transferred block of data to be written into the SCU main memory 6, and in the same cycle, for the SCU main memory 6 to be read for transfer of data requested by the requesting one of the CPU's 12. Thus, for the "WRITE-READ" cycle, only the validated portion of the block of data transferred to the SCU 4 in response to the data request from the requesting one of the CPU's 12 is written into the SCU main memory 6, whereas the entire block of data requested by the requesting one of the CPU's 12 is read from the SCU main memory 6. The read data contains the validated portion of the block of data received by the SCU 4 which was written into the SCU main memory 6.

The block of data transferred to the SCU 4 from the located one of the CPU's 12 is transferred into an SCU memory subsystem 22. The memory subsystem 22 includes a data write buffer 24, a data bypass multiplexer 26 and a data read buffer 28. The memory subsystem 22 serves to sequence and transfer the block of data transferred to the SCU 4 so that the data flow through the SCU 4 is controlled with the "WRITE-PASS" and "WRITE-READ" operations described above.

The SCU 8, the SCU main memory 6, the CCU 10, the SCU memory subsystem 22, the write buffer 24, the bypass multiplexer 26 and the read buffer 28 are all components well known in the art. They may be interconnected in a variety of well known configurations, and are shown in block form in FIG. 1 for purposes of representation only, since they do not in themselves constitute part of the present invention. Likewise, each CPU 12, the CPU cache 16, the control unit 18 and the I/O unit 20 shown as part of each of the CPU's 12 are well known components which may be interconnected in a variety of well known configurations and are shown in block form for purposes of representation only, since they do not in themselves constitute part of the present invention.

Figure 2:
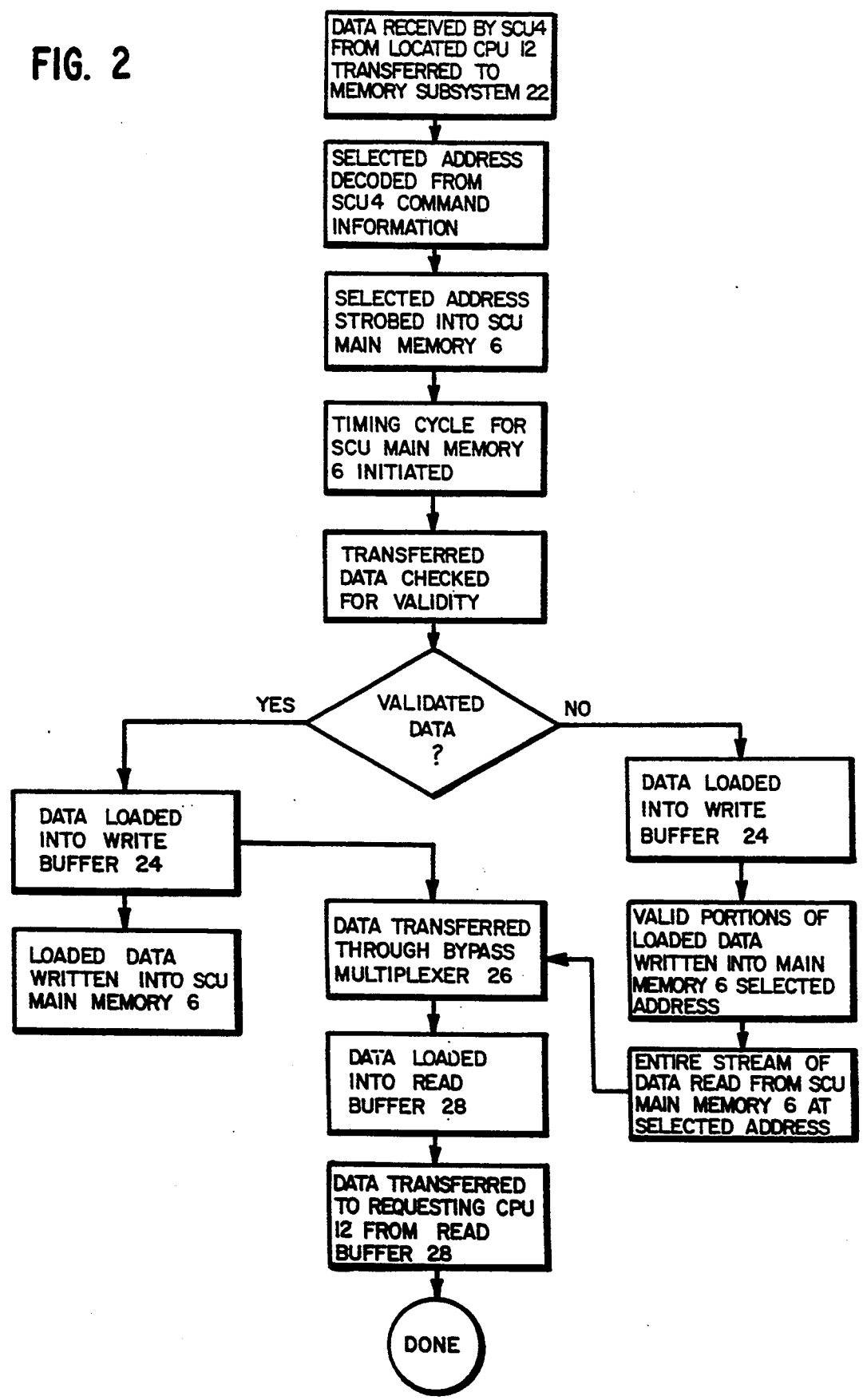
FIG. 2 is a basic flow chart of logic steps for the preferred embodiment of the invention adapted for use with the system shown FIG. 1.

The methodology of the present invention is shown in the system flow chart of FIG. 2. The SCU directory 8 determines that the most current version of data requested by a requesting one of the CPU's 12 is not in the SCU main memory 6, but rather in another one of the CPU's 12 located by the SCU directory 8 according to methodology well known in the art. The block of data transferred from the located one of the CPU's 12 with the most current version of the requested data is transferred to the memory subsystem 22 of the SCU 4. The SCU 4 command information is processed by the memory subsystem 22 to decode the proper address for selection of the requested data from the SCU main memory 6.

The selected address is then passed from the memory subsystem 22 to the SCU main memory 6. The timing cycle for the SCU main memory 6 is then initiated. Before the block of data retrieved from the located one of the CPU's 12 is passed to the SCU main memory, its validity as the most current version of the requested data is checked in the memory subsystem 22. If the checked block of data is validated, it is considered confirmed, and it is loaded into the write buffer 24. The write buffer 24 then concurrently transfers the loaded data into both the SCU main memory 6 and the bypass multiplexer 26.

If the checked block of data is not validated by the memory subsystem 22, it is considered unconfirmed. The unconfirmed block of data is also loaded into the write buffer 24, but then only the valid portions of the loaded unconfirmed block of data are written into the SCU main memory 6 at the selected address. As the write cycle for the selected address is completed, the memory subsystem 22 indicates a read cycle of the SCU main memory 6 at the selected address. The data read from the SCU main memory 6 at the selected address is then a mixture of new validated portions of the unconfirmed block of data transferred from the located one of the CPU's 12 and the old block of data already stored in the SCU main memory 6. The read data is considered confirmed at this point.

The bypass multiplexer 26 provides transfer point for the validated confirmed block of data passed to it directly from the write buffer 24 and the read data at the selected address from the SCU main memory 6. The bypass multiplexer 26 transfers either the validated confirmed block of data received from the write buffer 24 or the read data from the selected address of the SCU main memory 6 into the read buffer 28. The read buffer 28 then transfers the buffered data to the requesting one of the CPU's 12 via the SCU 4.

Thus, when the most current version of a block of data requested by a requesting one of the CPU's 12 is only available from the cache 16 of another one of the CPU's 12, the requested data is retrieved from the located one of the CPU's 12 and then transferred through the SCU 4 to the requesting one of the CPU's 12 with one of two possible dual operation program cycles which both update the SCU main memory 6 as the requested data is transferred through the SCU 4. When the block of data retrieved from the located one of the CPU's 12 is confirmed valid (most current) by the memory subsystem 22, the block of data is written into the SCU main memory 6 while being transferred through the memory subsystem 22 to the requesting one of the CPU's 12 without any subsequent read cycle of the SCU main memory 6.

When the retrieved block of data cannot be confirmed valid by the memory subsystem 22, the portions of the retrieved block of data that can be determined valid are written at the selected address for the requested data in the SCU main memory 6. The SCU main memory 6 is then read in its entirety at the same selected address in the same operation, providing a confirmed block of read data corresponding to the requested block of data. The confirmed block of read data is a mixture of the valid portions of the unconfirmed block of data retrieved from the located one of the CPU's 12 along with portions of a block of stored data in the SCU main memory 6 which correspond to the other portions of the requested block of data. The confirmed block of read data forms a complete data transfer of the requested data for the requesting one of the CPU's 12.

Figure 3:
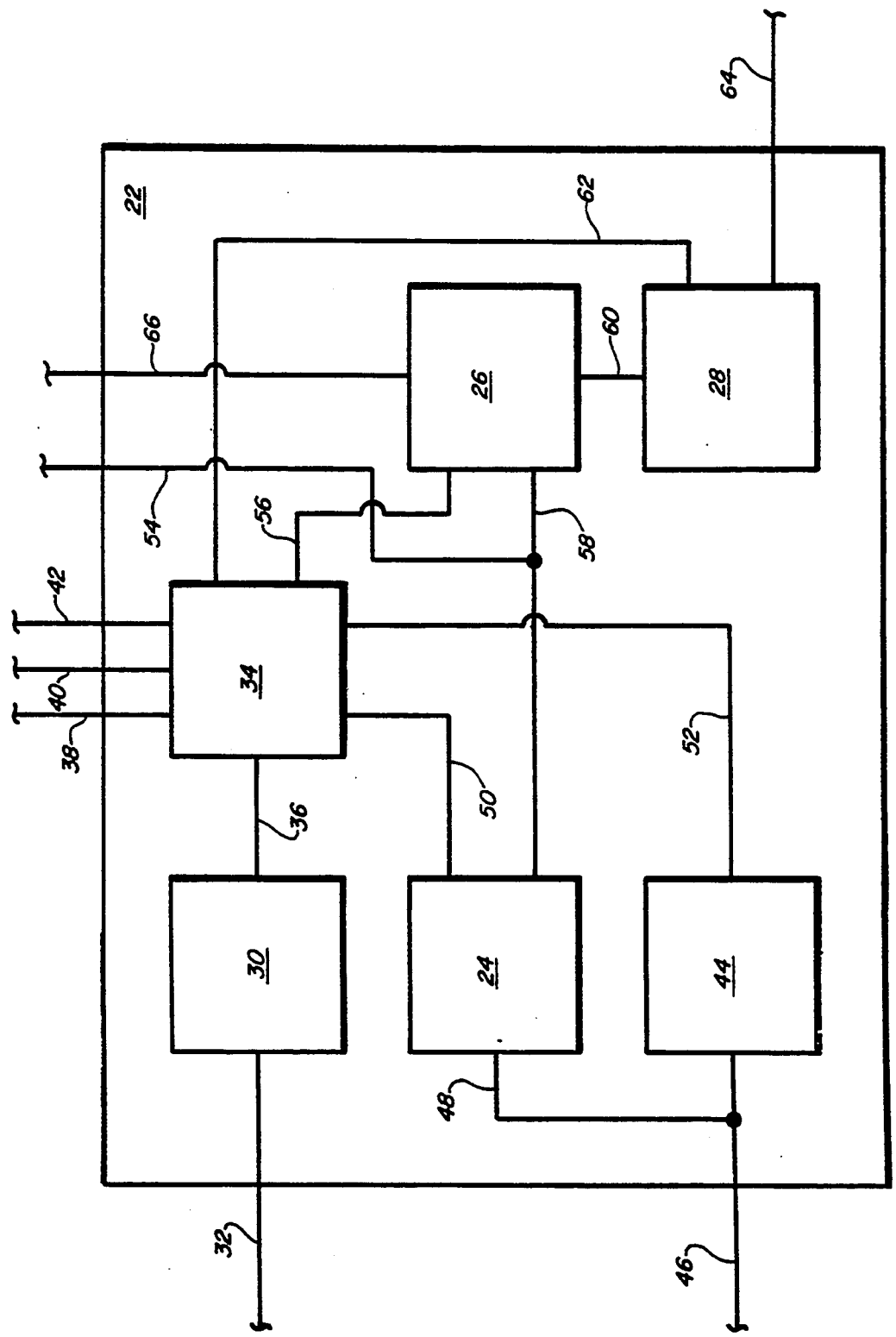
FIG. 3 is a typical block diagram of the preferred embodiment of the invention for use with the digital computer system shown in FIG. 1.

A preferred embodiment of the SCU memory subsystem 22 is shown in FIG. 3. The SCU memory subsystem 22 receives command information from the SCU 4 in an address decoder 30 on a command line 32. The address decoder 30 decodes the selected address for storage of the retrieved data in the SCU main memory 6 from the command information. The decoded address from the address decoder 30 is fed to a main memory controller 34 via an address line 36. The memory controller 34 transmits the selected address into the SCU main memory 6 via a select line 38.

The memory controller 34 then begins a timing cycle for the SCU main memory 6, with reference clock signals fed to the main memory 6 via a clock line 40 and memory array strobe signals fed to the main memory 6 via a memory array strobe line 42 to lock in the selected address. The memory subsystem 22 also includes a validity checker 44 to check the validity of the block of data retrieved from the located one of the CPU's 12 fed to the validity checker 44 via a validity input line 46. The retrieved block of data is also fed to the write buffer 24 via a write buffer input line 48. The write buffer 24 may typically include latching circuitry to latch and store the retrieved block of data until released by a write data latch signal supplied by the main memory controller 34 and fed to the write buffer 24 via a write buffer latch line 50.

The validity checker 44 feeds a validity signal to the main memory controller 34 via a validity signal line 52. If the validity signal on the line 52 indicates a valid condition for the entire block of transferred data, the main memory controller 34 unlatches the data stored in the write buffer 24 with the write buffer latch signal on the line 50 to feed the unlatched data to the SCU main memory 6 via a write buffer output line 54 at the selected address transmitted to the SCU main memory 6 on the line 38. Concurrently, the main memory controller 34 feeds a multiplexer latch signal to the bypass multiplexer 26 via a multiplexer latch line 56 allowing the data unlatched by the write buffer 24 to pass through the bypass multiplexer 26 via a bypass line 58 into the read buffer 28 via a read buffer input line 60. The data fed into the read buffer 28 is latched with a read buffer latch signal on a read buffer latch line 62, and then the latched data is released from the read buffer 28 by the main memory controller 34 at the end of the operation cycle with the read buffer latch signal. The data released by the read buffer 28 is then transmitted to the requesting one of the CPU's 12 via a read buffer output line 64.

If the validity signal on the line 52 does not indicate a valid condition for the entire block of transferred data, the main memory controller still unlatches the data stored in the write buffer 24 with the write buffer signal on the line 50, but the main memory controller 34 does not feed the bypass multiplexer 26 with the multiplexer signal on the line 56, so that the released data is only fed to the SCU main memory 6 on the line 54. As is well known, the main memory controller 34 only unlatches those portions of the received block of data confirmed valid by the validity checker 44.

After all the validified data is written, the main memory controller 34 commands the SCU main memory 6 to read the data stored at the selected address with a select signal on the line 38. The confirmed block of read data from the output of the SCU main memory 6 is fed to the bypass multiplexer 26 via a memory output line 66. The bypass multiplexer 26 passes the data read by the SCU main memory 6 to the read buffer 28 via the line 60. The data fed into the read buffer 28 is latched with the read buffer latch signal on the line 62, and then the latched data is released from the read buffer 28 by the main memory controller 34 for transmission through the SCU 4 to the requesting one of the CPU's 12 via the read buffer output line 64.

The address decoder 30, the memory controller 34 and the validity checker 44 shown in FIG. 3 are all well known components which may be interconnected in a variety of well known configurations, and are shown in block form in FIG. 3 for purposes of representation only, since they do not in themselves constitute part of the present invention.

It is apparent that the present invention as described above affords temporary buffer storage for the transfer of requested data through the SCU memory subsystem 22. This buffer storage, represented by the write buffer 24 and the read buffer 28, may conveniently be distributed within the memory subsystem 22 to minimize buffer storage requirements.

To this end, it is desirable that the write buffer 24, the bypass multiplexer 26 and the read buffer 28 be an integral part of the SCU main memory 6 so that these components can service the SCU main memory for ordinary read and write operations as well. Thus, the present invention further comprises the processing of requested data from a requesting one of the CPU's 12 from a selected one of the CPU's 12, as well as the version of the requested data stored in the SCU main memory 6.

Figure 4:
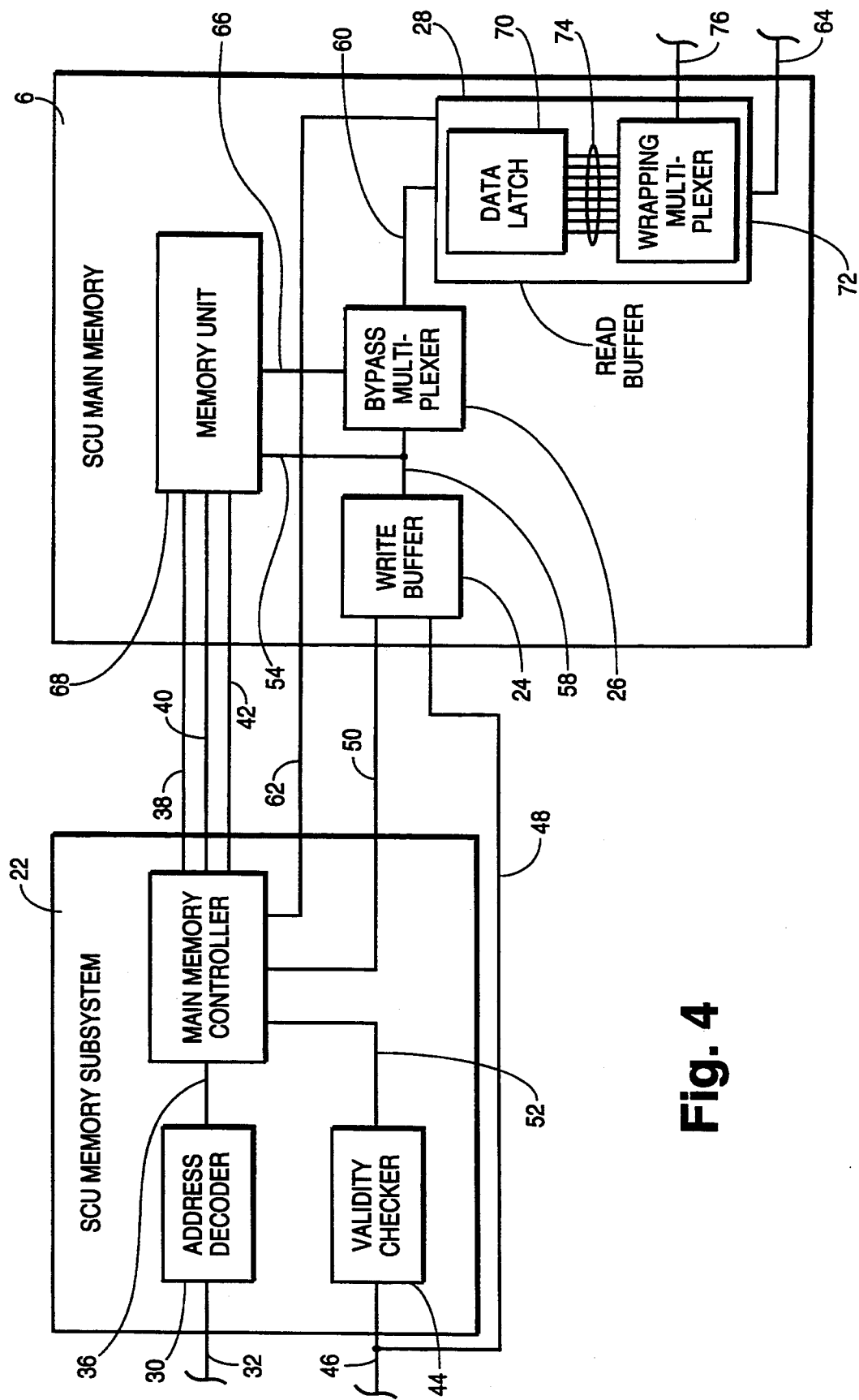
FIG. 4 is an alternate embodiment of the invention for use with the digital computer system shown in FIG. 1.

This processing is provided by the SCU main memory 6 in the alternative embodiment of the present invention shown in FIG. 4. In this embodiment, the write buffer 24, the bypass multiplexer 26 and the read buffer 28 are all shown as part of the SCU main memory 6 to illustrate how these components can be distributed to service the ordinary read and write operations of the SCU main memory 6 as well as the data transfer functions according to the present invention.

The selected address on the select line 38, the reference clock signals on the clock line 40 and the memory array strobe signals on the memory array strobe line 42 are fed to a memory unit 68 in the SCU main memory 6. The memory unit 68 preferably comprises an array of dynamic random access memory (DRAM) devices. The write buffer output line 54 from the write buffer 24 is fed to the memory array module. The bypass multiplexer 26 receives read data from the memory unit 68 on the line 66.

The operation of the alternative embodiment of the present invention is similar to that described for the embodiment described above in connection with FIG. 3. The write buffer 24 latches requested data from the selected one of the CPU's 12 on the line 48. The read buffer 28 latches data received from the memory unit 68 via the line 66, the bypass multiplexer 28 and the line 60.

If the data latched in the write buffer 24 is confirmed valid, it is transferred to the memory unit 68 via the line 54 for storage in the memory unit 68. At the same time, the confirmed data is transferred to the read buffer 28 via the line 58, the bypass multiplexer 26 and the line 60, and then latched by the read buffer 28 when it becomes available.

In the alternative embodiment shown in FIG. 4, the read buffer 28 comprises a multi-word data latch 70 coupled to a multi-word wrapping multiplexer 72 via a plurality of data word lines 74. As described above, the blocks of data transferred through the read buffer 28 are preferably of 640 bits each, including ECC check bits. These blocks of data preferably comprise eight quadwords of data, with each quadword of data comprising 64 data bits and 8 appended check bits.

When a block of data is requested by one of the CPU's 12, the request is made with the address of the first quadword of data that is requested from the block. The requesting one of the CPU's expects this quadword to be the first quadword of data in the block when received from the SCU 4, or from a selected one of the CPU's 12 via the SCU 4.

However, the respective CPU cache 16 for the selected one of the CPU's 12 may be storing the addressed quadword in a different part of the block of data that it transfers to the requesting one of the CPU's 12. For instance, it may be the fourth of the eight quadwords contained in the transferred block of data. Therefore, it is necessary in this instance for the transferred block of data to be "wrapped", or rearranged quadword by quadword, to conform to the order that the requesting one of the CPU's 12 expects it to be received.

This function is provided by the multi-word data latch 70 and the multi-word wrapping multiplexer 72. In this case, the multi-word data latch 70 latches each quadword in each block of data that it receives on the line 60. Each of the eight quadwords is available from a different one of eight outputs for the data latch 70 on a different one of the data word lines 74. Therefore, there are eight of the lines 74, one for each output of the data latch 70.

Likewise, there are eight inputs for the wrapping multiplexer 72, each one being fed a different one of the eight quadwords provided by the data latch 70 on the lines 74. The wrapping multiplexer 74, under control of a wrapping select signal on a line 76, rearranges the order of the quadwords that its output provides on the line 64. The wrapping select signal on the line 76 is controlled by the SCU 4 in response to the address request sent to the requesting one of the CPU's 12 to the SCU 4.

According to the alternative embodiment shown in FIG. 4, the blocks of data transferred through the main memory unit 6 may be characterized in terms of two distinct data paths. These data paths are the read data path and the write data path. Read data path comprises the data path extending from the line 60 through the bypass multiplexer 26, the line 60 and the read buffer 28, to the line 64. The write data path comprises the data path extending from the line 48 through the write buffer to the memory unit 68 via the line 54 and the bypass multiplexer 26 via the line 58.

A confirmed block of data in the write path is passed to the read path via the bypass multiplexer 26 for forwarding to the requesting one of the CPU's 12. Since the block of data is confirmed, it is also written into the memory unit 68 while still in the write data path. While still in the read data path, the confirmed block of data is wrapped by the wrapping multiplexer 72, if necessary, to be in the order expected by the requesting one of the CPU's 12.

Valid portions of an unconfirmed block of data are written into the memory unit 68 while the unconfirmed block of data is in the write data path so that the memory unit 68 then stores a most current, validated, or confirmed, block of data. The confirmed block of data is then read from the memory unit 68 and transferred through the read data path for forwarding to the requesting one of the CPU's 12.

The read buffer 28 wraps the data that it latches as necessary to reorganize it into the form requested by the requesting one of the CPU's 12. This wrapping operation functions both during the "WRITE-READ" and "WRITE-PASS" cycles. The wrapping operation also functions for wrapping entirely confirmed data and the portions of unconfirmed data that are confirmed valid in the read data.

Thus, there has been described above memory subsystem cycles for an SCU with a main memory which minimizes memory read latency when data is transferred from the writeback cache of a selected CPU through the SCU to a requesting CPU and the transferred data also updates the main memory. The cycles include one dual operation mode, a "WRITE-PASS" cycle, which with transferred data confirmed valid concurrently writes the transferred data into a selected address of the SCU main memory and transfers the data on to the requesting CPU without any intervening read cycle, and another dual operation mode, a "WRITE-READ" cycle, which with transferred data not confirmed valid writes portions of the unconfirmed data which is determined to be valid in the SCU main memory, and then reads the same selected address in the SCU main memory in the same operation, and transmits the read data to the requesting CPU.

It will be understood that various changes in the details, arrangements and configurations of the parts and assemblies which has been described and illustrated above in order to explain the nature of the present invention may be made by those skilled in the art within the principle and scope of the present invention as expressed in the appended claims.

What is claimed is:

1. For a digital computer system control unit (SCU) with a main memory and a plurality of central processing units (CPU's), each CPU with its own associated writeback cache, a method of transferring a block of data containing a plurality of quadword segments of data to one of the CPU's requesting the block of data from the cache of one of said other CPU's through said SCU and updating said SCU main memory, comprising the steps of:

requesting a block of data by one of said CPU's, said request being made with the address of the first quadword of data that is requested from said block of data;

transmitting said requested block of data from said cache of one of said other CPU's to said SCU;

checking said transmitted block of data to establish that said transmitted block of data is all valid data or only partially valid data;

if said transmitted block of data is established as all valid data then
  (a) rearranging each valid block of data, quadword by quadword, so that the first quadword of data in said valid block of data corresponds to the address used in making said request;
  (b) transmitting said rearranged valid block of data to said requesting CPU; and
  (c) concurrently writing said valid block of data in said SCU main memory at an address; or, if said transmitted block of data is established as only partially valid data then
  (a) determining the valid portions of said block of data;
  (b) writing said valid portions of said block of data in said SCU main memory at an address while in the same operation reading a block of data from said SCU main memory at said address;
  (c) rearranging said read block of data, quadword by quadword, so that the first quadword of data in said read block of data corresponds to the address used in making said request; and
  (d) transmitting said rearranged read block of data to said requesting CPU.

2. In a digital computer system having a system control unit (SCU) with a main memory and a plurality of central processing units (CPU's), each CPU with its own associated writeback cache, apparatus for transferring a block of data containing a plurality of quadword segments of data to one of the CPU's requesting the block of data from the cache of one of said other CPU's through said SCU and updating said SCU main memory, comprising:

means for requesting a block of data, said request being made with the address of the first quadword of data that is requested from said block of data;

means for transmitting said requested block of data from said cache of one of said other CPU's to said SCU;

means for checking said transmitted block of data to establish that said transmitted data is all valid data or only partially valid data;

means for rearranging said all valid block of data, quadword by quadword, so that the first quadword of data in said valid block of data corresponds to the address used in making said request;

means from transmitting said all valid block of data to said requesting CPU;

means for initiating the writing of said all valid block of data in said SCU main memory at an address concurrently with transmitting said all valid block of data to said requesting CPU;

means for determining the valid portions of said only partially valid block of data;

means for initiating the writing of said valid portions of said only partially valid block of data in said SCU main memory at said address while in the same operation initiating the reading of a block of data from said SCU main memory at said address; and, means for rearranging said read block of data, quadword by quadword, so that the first quadword of data in said real block of data corresponds to the address used in making said request;

means for transmitting said read rearranged block of data to said requesting CPU.

3. For a memory device useful with a system control unit (SCU) and a plurality of central processing units (CPU's), each CPU with its own associated writeback cache, a method of reducing memory read latency for a block of data containing a plurality of quadword segments of data transferred from one of said CPU's in response to a request identifying the address of the first quadword for said block of data from another of said CPU's comprising the steps of:

receiving command information from said SCU;

receiving data requested by a requesting one of said CPU's from the cache of another one of said CPU's;

decoding a memory address for said CPU requested data from said command information;

latching said decoded memory address;

checking said transmitted block of data to establish that said transmitted block of data is all valid data or only partially valid data;

if said transmitted block of data is established as all valid data then
  (a) rearranging said valid block of data, quadword by quadword, so that the first quadword of data in said valid block of data corresponds to the address used in making said request;
  (b) transmitting said valid rearranged block of data to said requesting CPU; and
  (c) concurrently writing said valid block of data in said SCU memory at said decoded memory address; or, if said transmitted block of data is established as only partially valid data then
  (a) determining the valid portions of said block of data;
  (b) writing said valid portions of said block of data in said SCU memory at said decoded memory address while in the same operation reading a block of data from said SCU memory at said decoded memory address;
  (c) rearranging said read block of data, quadword by quadword, so that the first quadword of data in said read block of data corresponds to the address used in making said request; and
  (d) transmitting said rearranged read block of data to said requesting CPU.

4. A memory device for use with a system control unit (SCU) and a plurality of central processing units (CPU's), each CPU with its own associated writeback cache, providing reduced memory read latency for a block of data containing a plurality of quadword segments of data transferred from one of said CPU's in response to a request identifying the address of the first quadword for said block of data from another of said CPU's, comprising:

means for requesting a block of data, said request being made with the address of the first quadword of data that is requested from said block of data;

means for receiving command information from said SCU;

means for receiving data requested by a requesting one of said CPU's from the cache of another one of said CPU's;

means for decoding a memory address for said CPU requested data from said command information;

means for latching said decoded memory address;

means for checking said received block of data to establish that said received block of data is all valid data or only partially valid data;

means for rearranging said all valid block of data, quadword by quadword, so that the first quadword of data in said valid block of data corresponds to the address used in making said request;

means for transmitting said rearranged all valid block of data to said requesting CPU;

means for initiating the writing of said all valid block of data in said memory at said latched memory address concurrently with transmitting said rearranged all valid block of data to said requesting CPU;

means for determining the valid portions of said only partially valid block of data;

means for initiating the writing of said valid portions of said only partially valid block of data in said memory at said latched memory address while in the same operation initiating the reading of a block of data from said memory at said latched memory address;

means for rearranging said read block of data, quadword by quadword, so that the first quadword of data in said read block of data corresponds to the address used in making said request; and means for transmitting said read rearranged block of data to said requesting CPU.

* * * * *